June 19, 1962 E. T. VINCENT ET AL 3,039,446
COMPRESSION IGNITION ENGINE
Filed Nov. 9, 1959 2 Sheets-Sheet 1

INVENTORS
EDWARD T. VINCENT
ABDEL RAZEK A.F. IBRAHIM
BY
Hauke & Haverty
ATTORNEYS

INVENTORS
EDWARD T. VINCENT
ABDEL RAZEK A.F. IBRAHIM
BY

ATTORNEYS

United States Patent Office 3,039,446
Patented June 19, 1962

3,039,446
COMPRESSION IGNITION ENGINE
Edward T. Vincent, 2240 Needham, and Abdel Razek A. F. Ibrahim, 508 S. Division, both of Ann Arbor, Mich.
Filed Nov. 9, 1959, Ser. No. 851,814
8 Claims. (Cl. 123—32)

Our invention relates to compression ignition engines and more particularly to a fuel injection system and method of operation.

Heretofore, compression ignition engines, particularly those utilizing energy cells for producing an initial high velocity flame ignition, exhibit characteristics of ignition lag and energy cell created turbulence late in the combustion cycle which it has been found effect a waste of energy, a loss of power through inefficient utilization of combustion heat, a higher fuel consumption than should be attained. In actual test studies, it has been demonstrated by analysis of combustion chamber pressure that a significant amount of combustion occurs long after top dead center so that its energy does not appreciably enhance engine power and due to there being a large area of cylinder exposed at such a time to combustion processes, heat loss is considerable.

An object of the present invention is to accelerate combustion in compression ignition engines by starting pre-combustion reactions in the energy cell as early as possible and effecting energy-cell produced turbulence at or ahead of main fuel injection.

Another object of the invention is to provide more effective control of combustion in compression ignition engines by reducing or eliminating ignition lag.

Another object of the invention is to provide an easier starting engine adaptable for utilizing wider range of fuels by improving ignition characteristics of energy cells.

Still another object of the invention is to enable compression ignition engines to operate a higher species than without excessive increase in fuel consumption by providing means for decreasing ignition lag.

A further object of the invention is to increase power and reduce fuel consumption of compression ignition engines by accelerating pre-combustion reactions and regulating combustion closer to top dead center.

Yet another object of the invention is to reduce exhaust gas and other operating temperatures of a compression ignition engine by providing a means of regulating combustion to effect higher pressure peaks at or near top dead center to utilize optimum available energy of combustion for power.

A still further object of the invention is to improve performance and efficiency of compression ignition engines utilizing energy cells by injecting a primary charge of fuel into said cell and then separately injecting the main charge of fuel into the hot gases issuing from said cell.

For a more complete understanding of the invention, reference may be had to the accompanying drawings illustrating a preferred embodiment of the invention in which like parts are referred to by like reference characters and in which.

Figure 5:
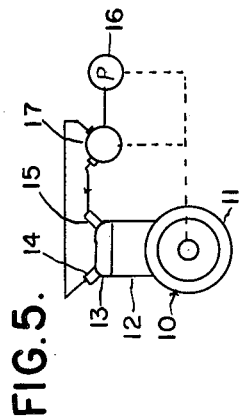
FIG. 5 is a diagrammatic illustration of a preferred fuel injection system utilized in the invention.

A preferred compression ignition engine 10 is illustrated diagrammatically in FIG. 5 as having a crankcase 11, a cylinder 12, and a cylinder head 13 provided with a primary fuel injector 14 and a main fuel injector 15, preferably supplied with fuel from a pump 16 and a timing device 17 preferably operably connected with the engine 10 as indicated by the dash lines so that fuel injection can be timed relative to engine operation. Any timing means may be utilized, whether directly operated by the engine 10 or not.

Figure 2:
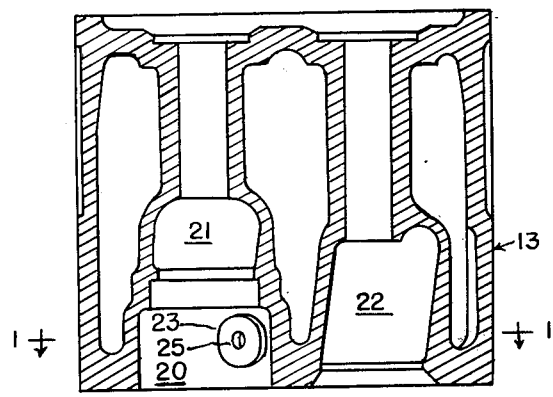
FIG. 2 is a cross sectional view taken substantially on the line 2—2 of FIG. 1.
Figure 1:
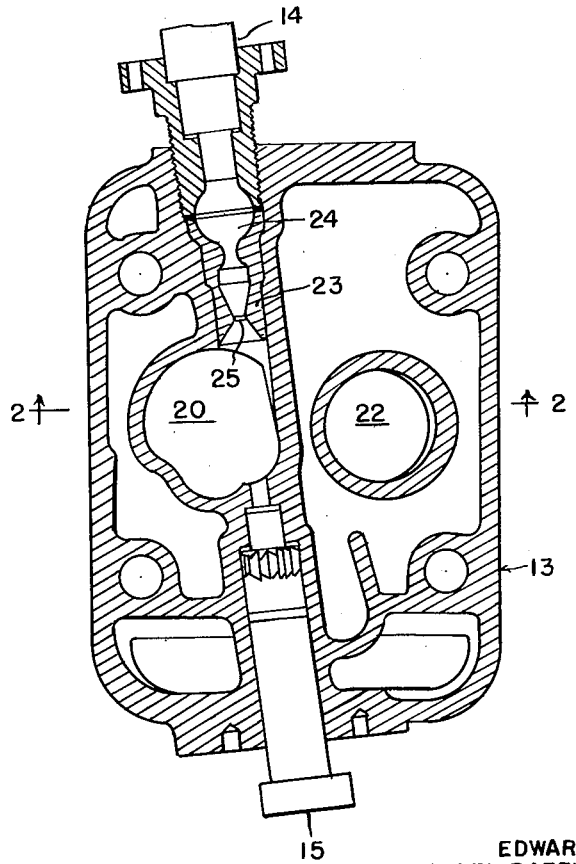
FIG. 1 is a cross sectional view of a preferred cylinder head taken substantially on the line 1—1 of FIG. 2.

In FIGS. 1 and 2, the cylinder head structure 13 is shown as having a combustion chamber 20, an exhaust valve chamber 21, and an intake valve chamber 22. An energy cell 23 is installed in the cylinder head 13 and has an ignition chamber 24 openly connected with the combustion chamber 20 through a venturi 25. The primary fuel injector 14 is preferably installed to inject fuel directly into the ignition chamber 24 of the energy cell 23, the fuel when ignited ejecting a high velocity turbulence-producing core of hot gas through the venturi 25 into the combustion chamber 20. The main fuel injector 15 is mounted in the cylinder head 13 so as to inject fuel directly into the combustion chamber in a direction such that the fuel impinges on the flame issuing from the energy cell venturi 25.

In operation, a predetermined portion of the total charge of fuel is injected by the primary injector 14 into the energy cell chamber 24 at some time in the cycle after exhaust begins and prior to a time at which compression is effective to initiate ignition of the fuel. The fuel is thus retained in the energy cell chamber 24 with insufficient air and compression to cause ignition, so that the fuel "cooks," and various pre-combustion reactions occur which make the fuel susceptible to complete instantaneous firing. As compression increases, more air is forced into the energy cell chamber 24 and, at near or slightly before top dead center, depending on the timing involved, the compression ratio, type of fuel and other factors, explosive conditions occur and a turbulent, high velocity jet of flame ejects through the venturi 25 into the combustion chamber. Substantially at this moment, the main fuel injector 15 is timed to discharge the remainder of the fuel charge into the combustion chamber 20, where it is immediately ignited by the burning primary charge of fuel.

Figure 4:
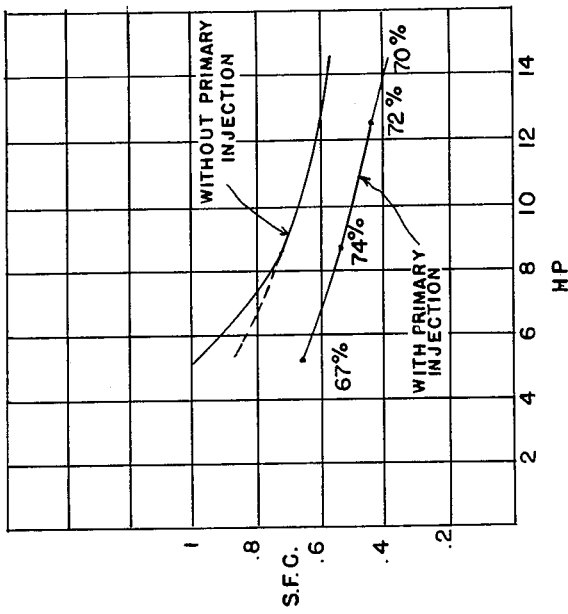
FIG. 4 is a cross-plot diagram illustrating brake horsepower of the test engine related to specific fuel consumption with and without primary injection.
Figure 3:
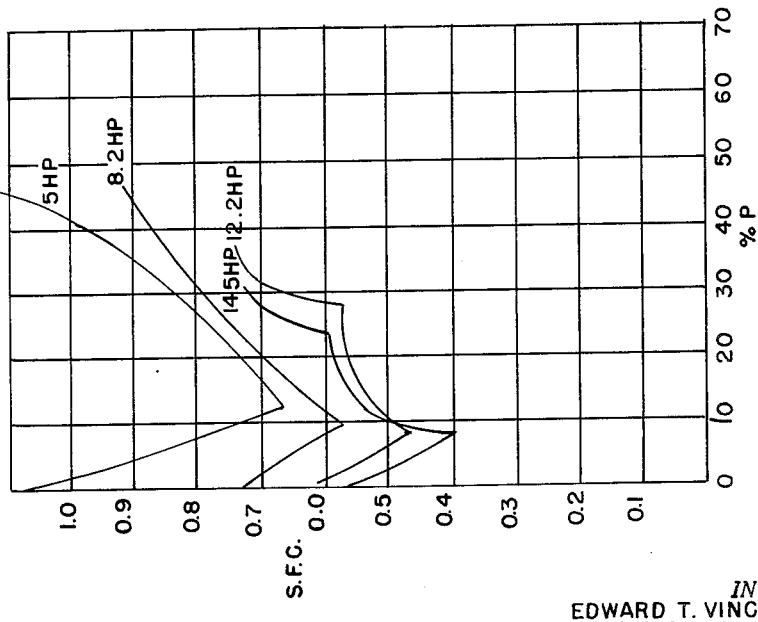
FIG. 3 is a diagram illustrating specific fuel consumptions at various horsepower for a test engine in which varying percentages of total fuel charge were injected prior to the main portion of the fuel charge in accordance with the present invention.

FIGS. 3 and 4 illustrate the effects of this method of operation, as confirmed by actual tests, based on the use of a Nordberg single cylinder type 4 FS compression ignition engine having a 4½" bore and a 5¼" stroke. The combustion chamber 20 was of the ignition swirl type and the energy cell 23 was a modified "Lanova" type equipped for testing purposes with a pressure indicator, Model 2 DC "Control Engineering Corp." (not shown), a quartz window (not shown) and photoelectric cell (not shown) to detect the ignition. Under conventional operating conditions, without the primary fuel injection, it was found that ignition lag was 30° when the fuel was injected at 19° before top center, so that firing occurred in the energy cell at 13° after top center. When a portion of the fuel charge was injected into the energy cell in accordance with the present invention, ignition lag was only 14° due to the pre-combustion reaction acceleration, and thus firing occurred at 5° before top center, the pressure rise becoming quite steep at top dead center and reaching a much higher peak than without primary fuel injection.

The effect of this method of operation is to improve engine performance, and the heterogeneous combustion approaches the constant volume process.

In FIG. 3, for example, where specific fuel consumption (s.f.c.) is plotted against the percentage of total fuel charge (% P) injected by the primary injector 14 for various brake horsepower (H.P.) operation, it will be seen that fuel consumption is considerably less when about 10% of the total fuel charge is injected by the primary injector 14 than when all the fuel is injected by the main injector 15 (0% P on the chart) regardless of brake horsepower.

In FIG. 4, a cross-plot of s.f.c. to H.P. is illustrated showing that specific fuel consumption on the test engine using primary fuel injection ran generally between 65% to 75% of the specific fuel consumption on the same engine without primary fuel injection.

Other effects were also noted. For example, exhaust gas temperature was reduced due to utilization of a greater proportion of the available energy toward increasing power due to the increase of expansion ratio. Engine jacket temperature was less due to the existence of total combustion during that period of stroke at which cylinder volume was at a minimum preventing heat loss through the cylinder walls. The exhaust was also cleaner at high loads due to more complete combustion of fuel.

Although we have described only one preferred embodiment of our invention, it will be apparent to one skilled in the art to which the invention pertains that various changes and modifications may be made therein without departing from the spirit of the invention or the scope of the appended claims.

We claim:

1. A method of operating a compression ignition engine having a main combustion chamber, an energy cell communicating therewith and a fuel injection system; comprising injecting a predetermined portion of the total fuel charge into the energy cell prior to the time at which compression is effective to initiate ignition therein and separately injecting the remainder of the total fuel charge into the combustion chamber substantially at the moment at which ignition of the first portion of the fuel ignites in the energy cell.

2. The method as defined in claim 1 and in which the first portion of the fuel charge is injected between the beginning of the exhaust process and the end of the compression stroke and the remainder of the fuel charge is injected near the end of the compression stroke.

3. The method as defined in claim 1 and in which said first portion comprises approximately ten percent of the total fuel charge.

4. In a compression ignition engine having a combustion chamber and an energy cell open to said combustion chamber, a primary injector means operable to directly inject a predetermined portion only of the fuel charge into said energy cell prior to the time at which compression is effective to initiate ignition therein, a main fuel injector means separate from said primary injector means and operable at a timed interval subsequent to the operation of said primary injector means to inject the remainder of the fuel charge into said combustion chamber, said energy cell being operable upon compression ignition of the combustible fuel mixture therein to eject a high velocity high temperature gas stream into said combustion chamber for igniting the fuel injected therein by said main fuel injector means.

5. The engine as defined in claim 4 and in which said main fuel injector means is operable to inject fuel into said combustion chamber substantially at the moment at which the high velocity high temperature gas stream is ejected from said energy cell.

6. The engine as defined in claim 4 and having timed means operable to actuate said primary fuel injector to inject a predetermined portion of the total fuel charge prior to a time at which compression is effective to initiate ignition.

7. The engine as defined in claim 6 and in which said timing means is operable to actuate said main fuel injector to inject the remainder of the total fuel charge substantially at the moment at which ignition of said first fuel portion is initiated.

8. The engine as defined in claim 4 and in which said energy cell includes a restricted orifice opening into said combustion chamber, and in which said main fuel injector is located to inject fuel in impinging relation with the high velocity high temperature gas stream issuing from said energy cell into said combustion chamber.

References Cited in the file of this patent
UNITED STATES PATENTS
2,599,908    Gehrandt _____ June 10, 1952